(12) United States Patent
Chen et al.

(10) Patent No.: US 12,061,991 B2
(45) Date of Patent: Aug. 13, 2024

(54) TRANSFER LEARNING WITH MACHINE LEARNING SYSTEMS

(71) Applicants: International Business Machines Corporation, Armonk, NY (US); National Tsing Hua University, Hsinchu (TW)

(72) Inventors: Pin-Yu Chen, White Plains, NY (US); Sijia Liu, Somerville, MA (US); Chia-Yu Chen, White Plains, NY (US); I-Hsin Chung, Chappaqua, NY (US); Tsung-Yi Ho, Hsinchu (TW); Yun-Yun Tsai, Taipei (TW)

(73) Assignees: International Business Machines Corporation, Armonk, NY (US); National Tsing Hua University, Hsinchu (TW)

( * ) Notice: Subject to any disclaimer, the term of this patent is extended or adjusted under 35 U.S.C. 154(b) by 776 days.

(21) Appl. No.: 17/029,506

(22) Filed: Sep. 23, 2020

(65) Prior Publication Data
US 2022/0092407 A1    Mar. 24, 2022

(51) Int. Cl.
*G06N 3/094* (2023.01)
*G06N 3/08* (2023.01)
(Continued)

(52) U.S. Cl.
CPC .............. *G06N 3/094* (2023.01); *G06N 3/08* (2013.01); *G06N 3/096* (2023.01); *G06N 20/00* (2019.01);
(Continued)

(58) Field of Classification Search
CPC .......... G06N 3/096; G06N 3/094; G06N 3/08; G06N 20/00; G06F 18/21347; G06F 18/213; G06F 18/214
See application file for complete search history.

(56) References Cited

U.S. PATENT DOCUMENTS 10,783,401 B1 *    9/2020    Jiang ...................... G06N 3/086
2017/0061294 A1 *    3/2017    Weston .................. G06N 3/045
(Continued)

OTHER PUBLICATIONS

Neekhara et al., "Adversarial Reprogramming of Text Classification Neural Networks" Aug. 15, 2019, arXiv: 1809.01829v4, pp. 1-10. (Year: 2019).*
(Continued)

*Primary Examiner* — Miranda M Huang
*Assistant Examiner* — Chase P. Hinckley
(74) *Attorney, Agent, or Firm* — Scully, Scott, Murphy & Presser, P.C.; Caleb Wilkes (57) ABSTRACT

Transfer learning in machine learning can include receiving a machine learning model. Target domain training data for reprogramming the machine learning model using transfer learning can be received. The target domain training data can be transformed by performing a transformation function on the target domain training data. Output labels of the machine learning model can be mapped to target labels associated with the target domain training data. The transformation function can be trained by optimizing a parameter of the transformation function. The machine learning model can be reprogrammed based on input data transformed by the transformation function and a mapping of the output labels to target labels.

18 Claims, 5 Drawing Sheets

(51) Int. Cl.
  *G06N 3/096* (2023.01)
  *G06N 20/00* (2019.01)
  *G06F 18/213* (2023.01)
  *G06F 18/2134* (2023.01)
  *G06F 18/214* (2023.01)

(52) U.S. Cl.
  CPC ...... *G06F 18/213* (2023.01); *G06F 18/21347* (2023.01); *G06F 18/214* (2023.01)

(56) References Cited

U.S. PATENT DOCUMENTS

| | | | | |
|---|---|---|---|---|
| 2017/0372201 | A1* | 12/2017 | Gupta | G06N 3/084 |
| 2018/0276560 | A1* | 9/2018 | Hu | G06N 20/00 |
| 2018/0341872 | A1* | 11/2018 | Wang | G06V 10/776 |
| 2019/0138607 | A1* | 5/2019 | Zhang | G06N 3/044 |
| 2020/0082097 | A1* | 3/2020 | Poliakov | G06F 21/577 |
| 2021/0089909 | A1* | 3/2021 | Binkowski | G10L 13/02 |
| 2021/0089921 | A1* | 3/2021 | Aghdasi | G06N 5/04 |
| 2021/0224425 | A1* | 7/2021 | Nasr-Azadani | G06N 20/20 |
| 2021/0375269 | A1* | 12/2021 | Yavuz | G10L 15/063 |
| 2021/0383280 | A1* | 12/2021 | Shaloudegi | G06N 20/20 |
| 2022/0076074 | A1* | 3/2022 | Li | G06V 10/82 |
| 2022/0122297 | A1* | 4/2022 | Orihashi | G06N 3/088 |

OTHER PUBLICATIONS

Elsayed et al., "Adversarial Reprogramming of Neural Networks" Nov. 29, 2018, arXiv: 1806.11146v2, pp. 1-14. (Year: 2018).*
Lee et al., "Reprogramming GANs via Input Noise Design" Sep. 14, 2020, pp. 1-17. (Year: 2020).*
Yan et al., "Neural Data Server: A Large-Scale Search Engine for Transfer Learning Data" Apr. 1, 2020, arXiv: 2001.02799v3, pp. 1-13. (Year: 2020).*
Wright and Augenstein, "Transformer Based Multi-Source Domain Adaptation" Sep. 16, 2020, arXiv: 2009.07806v1, pp. 1-12 (Year: 2020).*
Li et al., "Asymmetric GAN for Unpaired Image-to-image Translation" Dec. 25, 2019, arXiv: 1912.11660v1, pp. 1-16. (Year: 2019).*
Balasubramanian et Ghadimi, "Zeroth-order (Non)-Convex Stochastic Optimization via Conditional Gradient and Gradient Updates" 2018, NeurIPS, pp. 1-10. (Year: 2018).*
Conze et al., "Abdominal multi-organ segmentation with cascaded convolutional and adversarial deep networks" Jan. 26, 2020, arXiv: 2001.09521v1, pp. 1-10. (Year: 2020).*
Zenil, Hector, "Reprogramming Matter, Life, and Purpose" Aug. 13, 2017, arXiv: 1704.00725v4, pp. 1-12. (Year: 2017).*
Ruan et al., "Learning to Learn by Zeroth-Order Oracle" Feb. 7, 2020, arXiv: 1910.09464v2, pp. 1-17. (Year: 2020).*
Tsai et al., "Transfer Learning without Knowing: Reprogramming Black-box Machine Learning Models with Scarce Data and Limited Resources" Jul. 29, 2020, arXiv: 2007.08714v2, pp. 1-13. (Year: 2020).*
Yan et Guo, "Adversarial Partial Multi-Label Learning" Jun. 15, 2020, arXiv: 1909.06717v2, pp. 1-11. (Year: 2020).*
Shafahi et al., "Adversarially Robust Transfer Learning" Feb. 21, 2020, arXiv: 1905.08232v2, pp. 1-14. (Year: 2020).*
Lin et al., "Black-box adversarial sample generation based on differential evolution" Aug. 1, 2020, pp. 1-11. (Year: 2020).*
Zhang et al., "Two sides of the Same Coin: White-box and Black-box Attacks for Transfer Learning" Aug. 25, 2020, arXiv: 2008.11089v1, pp. 1-9. (Year: 2020).*
Su et al., "Active Adversarial Domain Adaptation" Mar. 9, 2020, arXiv: 1904.07848v2, pp. 1-12. (Year: 2020).*
Orekondy et al., "Knockoff Nets: Stealing Functionality of Black-Box Models" Dec. 6, 2018, arXiv: 1812.02766v1, pp. 1-17. (Year: 2018).*
Bagdasaryan et Shmatikov, "Blind Backdoors in Learning Models" Sep. 2, 2020, arXiv: 2005.03823v2, pp. 1-16. (Year: 2020).*
Thiagarajan et al., "Distill-to-Label: Weakly Supervised Instance Labeling Using Knowledge Distillation" Jul. 26, 2019, arXiv: 1907.12926v1, pp. 1-7. (Year: 2019).*
Xie et al., "Domain-Adversarial Multi-Task Framework for Novel Therapeutic Property Prediction of Compounds" Sep. 28, 2018, arXiv: 1810.00867v1, pp. 1-8. (Year: 2018).*
Jin et al., "A Unified Framework for Analyzing and Detecting Malicious Examples of DNN Models" Jun. 26, 2020, arXiv: 2006.14871v1, pp. 1-13. (Year: 2020).*
Cao et al., "Partial Transfer Learning with Selective Adversarial Networks" Jul. 25, 2017, arXiv: 1707.07901v1, pp. 1-9. (Year: 2017).*
Kloberdanz, E., "Reprogramming of neural networks: A new and improved machine learning technique," Graduate Theses and Dissertations, 2020, Iowa State University, https://lib.dr.iastate.edu/etd/17943, 30 pages.
Biggio, B., et al., "Wild patterns: Ten Years After the Rise of Adversarial Machine Learning", arXiv:1712.03141v2, Jul. 19, 2018, 17 pages.
Biggio, B., et al., "Evasion attacks against machine learning at test time", arXiv:1708.06131v1, Aug. 21, 2017, 16 pages.
Brendel, W., et al., "Decision-based adversarial attacks: Reliable attacks against black-box machine learning models", arXiv:1712.04248v2, Feb. 16, 2018, 12 pages.
Carlini, N., et al., "Towards Evaluating the Robustness of Neural Networks", arXiv:1608.04644v2, Mar. 22, 2017, 19 pages.
Chen, P.-Y., et al., "ZOO: Zeroth Order Optimization Based Black-box Attacks to Deep Neural Networks without Training Substitute Models", arXiv:1708.03999v2, Nov. 2, 2017, 13 pages.
Chen, P.-Y., et al., "EAD: Elastic-Net Attacks to Deep Neural Networks via Adversarial Examples", arXiv:1709.04114v3, Feb. 10, 2018, 19 pages.
Chen, X., et al., "Targeted Backdoor Attacks on Deep Learning Systems Using Data Poisoning", arXiv:1712.05526v1, Dec. 15, 2017, 18 pages.
Cheng, M., et al., "Query-Efficient Hard-label Black-box Attack: An Optimization-based Approach", arXiv:1807.04457v1, Jul. 12, 2018, 12 pages.
Cheng, M., et al., ". Sign-OPT: A query-efficient hard-label adversarial attack", arXiv:1909.10773v3, Feb. 14, 2020, 16 pages.
Codella, N., et al., "Skin Lesion Analysis Toward Melanoma Detection 2018: A Challenge Hosted by the International Skin Imaging Collaboration (ISIC)", arXiv:1902.03368v2, Mar. 29, 2019, 12 pages.
Craddock, C., et al., "OP09 The Neuro Bureau Preprocessing Initiative: open sharing of preprocessed neuroimaging data and derivatives", Neuroinformatics 2013 6th INCF Congress Program & abstracts, Aug. 27-29, 2012, pp. 68-21.
Elsayed, G.F., et al., Adversarial reprogramming of neural networks, arXiv:1806.11146v2, Nov. 29, 2018, 14 pages.
Eslami, T., et al., "ASD-DiagNet: A hybrid learning approach for detection of Autism Spectrum Disorder using fMRI data", arXiv:1904.07577v1, Apr. 16, 2019, 8 pages.
Gao, X., et al., "On the Information-Adaptive Variants of the ADMM: an Iteration Complexity Perspective", Nov. 7, 2014, http://citeseerx.ist.psu.edu/viewdoc/download;jsessionid=1155DAC2095088F8073BA569F3E486A0?doi=10.1.1.723.6088&rep=rep1&type=pdf, Accessed on Sep. 23, 2020, 35 pages.
Ghadimi, S., et al., "Stochastic first-and zeroth-order methods for nonconvex stochastic programming", arXiv:1309.5549v1, Sep. 22, 2013, 25 pages.
Goodfellow, I.J., et al., "Explaining and harnessing adversarial examples", arXiv:1412.6572v3, Mar. 20, 2015, 11 pages.
Gu, T., et al., "BadNets: Evaluating Backdooring Attacks on Deep Neural Networks", IEEE Access, Special Section on Advanced Software and Data Engineering for Secure Societies, Received Feb. 27, 2019, accepted Mar. 21, 2019, current version Apr. 18, 2019, pp. 47230-47244, vol. 7.
He, K., et al., "Deep Residual Learning for Image Recognition", arXiv:1512.03385v1, Dec. 10, 2015, 12 pages.
Heinsfeld, A.S., et al., "Identification of autism spectrum disorder using deep learning and the ABIDE dataset", NeuroImage: Clinical (56) References Cited

OTHER PUBLICATIONS (2018), Received Nov. 1, 2016; Received in revised form Jun. 30, 2017; Accepted Aug. 22, 2017, pp. 16-23, vol. 17.
Iandola, F., et al., "DenseNet: Implementing Efficient ConvNet Descriptor Pyramids Technical Report", arXiv:1404.1869v1, Apr. 7, 2014, 11 pages.
Ilyas, A., et al., "Black-box Adversarial Attacks with Limited Queries and Information", Proceedings of the 35 th International Conference on Machine Learning, arXiv:1804.08598v3, Jul. 11, 2018, 10 pages.
Kingma, D.P., et al., "Adam: A method for stochastic optimization", arXiv:1412.6980v9, Jan. 30, 2017, 15 pages.
Li, K.M., et al., "Skin Lesion Analysis Towards Melanoma Detection via End-to-end Deep Learning of Convolutional Neural Networks", arXiv:1807.08332v1, Jul. 22, 2018, 5 pages.
Lin, T.-Y., et al., "Focal Loss for Dense Object Detection", arXiv:1708.02002v2, Feb. 7, 2018, 10 pages.
Liu, S., et al., "Zeroth-Order Stochastic Variance Reduction for Nonconvex Optimization", arXiv:1805.10367v1, May 25, 2018, 24 pages.
Liu, S., et al., "signSGD via Zeroth-Order Oracle", Published as a conference paper at ICLR 2019, Sep. 17, 2018, modified Feb. 22, 2019, 24 pages.
Liu, S., et al., "A Primer on Zeroth-Order Optimization in Signal Processing and Machine Learning", arXiv:2006.06224v2, Jun. 21, 2020, 13 pages.
Munoz-Gonzalez, L., et al., "Towards Poisoning of Deep Learning Algorithms with Back-gradient Optimization", arXiv:1708.08689v1, Aug. 29, 2017, 11 pages.
Neekhara, P., et al., "Adversarial Reprogramming of Text Classification Neural Networks", arXiv:1809.01829v4, Aug. 15, 2019, 10 pages.
Silberman, N., et al., "Tensorflow-slim image classification model library", tree/master/research/slim, Accessed Sep. 22, 2020, 11 pages.
Pan, S., et al., "A Survey on Transfer Learning", IEEE Transactions on Knowledge and Data Engineering, Oct. 2010, pp. 1345-1359, vol. 22, No. 10.
Raghu, M., et al., "Transfusion: Understanding Transfer Learning for Medical Imaging", arXiv:1902.07208v3, Oct. 29, 2019, 22 pages.
Sarki, R., et al., "Convolutional neural networks for mild diabetic retinopathy detection: an experimental study", bioRxiv preprint, Aug. 28, 2019, https://www.biorxiv.org/content/10.1101/763136v1.full.pdf, Posted Sep. 9, 2019, 18 pages.
Shafahi, A., et al., "Poison Frogs! Targeted Clean-Label Poisoning Attacks on Neural Networks", arXiv:1804.00792v2, Nov. 10, 2018, 15 pages.
Stallkamp, J., et al., "Man vs. computer: Benchmarking machine learning algorithms for traffic sign recognition", Neural Networks (2012), Aug. 2012, pp. 323-332, vol. 32, 2012 Special Issue.
Szegedy, C., et al., "Intriguing properties of neural networks", arXiv:1312.6199v4, Feb. 19, 2014, 10 pages.
Szegedy, C., et al., "Rethinking the inception architecture for computer vision", 2016 IEEE Conference on Computer Vision and Pattern Recognition (CVPR), Jun. 27-30, 2016, pp. 2818-2826.
Tschandl, P., et al., "The HAM10000 dataset: A large collection of multi-source dermatoscopic images of common pigmented skin lesions", Scientific Data, Received Apr. 25, 2018, Accepted Jun. 26, 2018, Published Aug. 14, 2018, 9 pages, 5:180161.
Tu, C.-C., et al., "AutoZOOM: Autoencoder-based Zeroth Order Optimization Method ,for Attacking Black-box Neural Networks", arXiv:1805.11770v5, Jan. 31, 2020, 13 pages.
Xie, C., et al., "DBA: Distributed backdoor attacks against federated learning", Published as a conference paper at ICLR 2020, Sep. 25, 2019, modified May 2, 2020, 19 pages.
Tsai, Y.-Y.., et al., "Transfer Learning without Knowing: Reprogramming Black-box Machine Learning Models with Scarce Data and Limited Resources", Proceedings of the 37th International Conference on Machine Learning, Vienna, Austria, PMLR 119, Jul. 2020, 13 pages (Grace Period Disclosure).

\* cited by examiner

TRANSFER LEARNING WITH MACHINE LEARNING SYSTEMS

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE(S): Transfer Learning without Knowing: Reprogramming Black-box Machine Learning Models with Scarce Data and Limited Resources, Yun-Yun Tsai, Pin-Yu Chen, Tsung-Yi Ho, Proceedings of the 37th International Conference on Machine Learning, Vienna, Austria, PMLR 119, July 2020.

BACKGROUND

The present application relates generally to computers and computer applications, and more particularly to machine learning and transfer learning.

Machine learning is a technique in which a machine, for example, a computer processor, can automatically learn and improve from experience without being explicitly programmed. For instance, in machine learning, a machine can be trained and retrained based on data to perform a task. Transfer learning techniques in machine learning allow for knowledge gained in a machine learning model trained to perform one task to be used on a second task.

Current transfer learning techniques in machine learning systems utilize full access to a source model, for example, access to the model architecture and optimized weights of the machine learning systems. For example, the current approaches require full knowledge of the source model and the ability to change the model weights and/or architecture. Such a requirement may prevent transfer learning on some machine learning systems, for example, including those which can be powerful but access-limited. Examples of access-limited machine learning systems can include an online prediction application programming interface (API), machine learning provided as a service (e.g., Machine Learning as a Service), commercial products, and/or others. Such current approaches to transfer learning may be impracticable if the source model is unchangeable. For example, in access-limited machine learning systems, a user's access right can be limited to choosing data samples as inputs to a black-box model and observing corresponding predictions as outputs. In access-limited or black-box setting, gradient-based learning approach may be infeasible.

BRIEF SUMMARY

In one or more embodiments, a system and method for transfer learning can be provided. A system, in one aspect, can include a processor and a memory device coupled with the processor. The processor can be configured to receive a machine learning model. The processor can also be configured to receive target domain training data for reprogramming the machine learning model using transfer learning. The processor can also be configured to transform the target domain training data by performing a transformation function on the target domain training data. The processor can also be configured to map output labels of the machine learning model to target labels associated with the target domain training data. The processor can also be configured to train the transformation function by optimizing a parameter of the transformation function.

A method, in an aspect, can include receiving a machine learning model. The method can also include receiving target domain training data for reprogramming the machine learning model using transfer learning. The method can also include transforming the target domain training data by performing a transformation function on the target domain training data. The method can also include mapping output labels of the machine learning model to target labels associated with the target domain training data. The method can also include training the transformation function by optimizing a parameter of the transformation function. The method can also include reprogramming the machine learning model using the target domain training data transformed by the trained transformation function and the mapping of output labels to target labels.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 1 is a diagram illustrating an overview of black-box adversarial reprogramming in an embodiment.

FIG. 2 is a block diagram illustrating a procedure for black-box adversarial reprogramming in an embodiment.

FIG. 3 is a flow diagram illustrating a method of adversarial reprogramming in an embodiment, of a model such as an artificial intelligence (AI) model such as a neural network.

FIG. 4 is a diagram showing components of a system in one embodiment, which can provide transfer learning, for example, in black-box machine learning models.

FIG. 5 illustrates a schematic of an example computer or processing system that may implement a transfer learning system in an embodiment.

DETAILED DESCRIPTION

Systems and methods can be provided for transfer learning in machine learning (ML) systems. Current transfer learning methods are mainly based on fine-tuning a pre-trained model with target-domain data. In one or more embodiments, black-box adversarial reprogramming (BAR) is disclosed, that repurposes a well-trained black-box ML model (e.g., a prediction API, proprietary software, or another) for solving different ML tasks, for example, in the scenario with scarce data and constrained resources. In one or more embodiment, the black-box adversarial reprogramming may utilize data perturbations in model prediction. A system and/or method in one or more embodiments allow for the capability to use pre-trained ML models, e.g., high-performance but unknown ML models, to gain learning capability for transfer learning. In one or more embodiments, the system and/or method can use zeroth order optimization and multi-label mapping techniques, to reprogram a black-box ML model based on (e.g., solely based on) its input-output responses without knowing or having to know the model architecture or changing any parameter of the model.

Transfer learning is a machine learning (ML) methodology for learning to solve a new task in a target domain based on the knowledge transferred from a source-domain task. An example target-domain task is transfer learning of medical imaging with a large and rich benchmark dataset (e.g., ImageNet) as the source-domain task, since high-quality labeled medical images are often scarce and costly to acquire new samples. For deep learning models, transfer learning is often achieved by fine-tuning a pre-trained source-domain model with the target-domain data, which requires complete knowledge and full control of the pre-trained model, including knowing and modifying the model architecture and pre-trained model parameters.

In one or more embodiments, the system and/or method provide transfer learning, for example, without needing to fine-tune a pre-trained model, for learning a new task. In one or more embodiments, the system and/or method may provide for transfer learning which can be expanded to black-box ML models where nothing but only the input-output model responses (e.g., data samples and their predictions) are observable. In contrast, fine-tuning in a white-box transfer learning method assumes the source-domain model to be transparent and modifiable. In one or more embodiments, the system and methods can be applied in data settings, where there is limited available data, for example, often encountered in transfer learning.

In an aspect, black-box adversarial reprogramming (BAR) reprograms a deployed ML model (e.g., an online image classification service) for black-box transfer learning, for example, in a black-box setting and/or in a case in which there is data scarcity and resource constraint. Known adversarial reprogramming method assumes complete knowledge of the pre-trained (target) model, which precludes the ability of reprogramming a well-trained but access-limited ML models such as prediction APIs or proprietary software that only reveal model outputs based on queried data inputs. While most of ML tasks use large amount of data, in some scenarios such as medical applications, massive data collection can be expensive, if not impossible, for example, when clinical trials, expert annotation or sensitive data are involved. Consequently, without transfer learning, the practical limitation of data scarcity may hinder the strength of complex (large-scaled) ML models such as deep neural networks (DNNs). Moreover, even with moderate amount of data, researchers may not have sufficient computation resources or budgets to train a DNN as large as a commercial ML model or perform transfer learning on a large pre-trained ML model.

The system and/or method in one or more embodiments, for example, by adversarial reprogramming of black-box models, tackle in a cost-effective manner these challenges, for example, challenges posed by black-box setting and data scarcity and resource constraint in transfer learning. The system and/or method in one or more embodiments allow for extending of the white-box transfer learning to the black-box regime and using well-trained but access-limited ML models for transfer learning. Examples of an application of a black-box model can include, but not limited to, black-box image classification models for solving medical imaging tasks, as image classification is one of the most mature AI applications and many medical ML tasks often entail data scarcity challenges. For example, the system and/or method may leverage the powerful feature extraction capability of black-box ImageNet classifiers to achieve high performance in image classification tasks with limited data. The system and/or method can be applicable to other artificial intelligence (AI) models, e.g., machine learning models such as neural network or others models, e.g., classification models such as image classification models and/or others.

Figure 1:
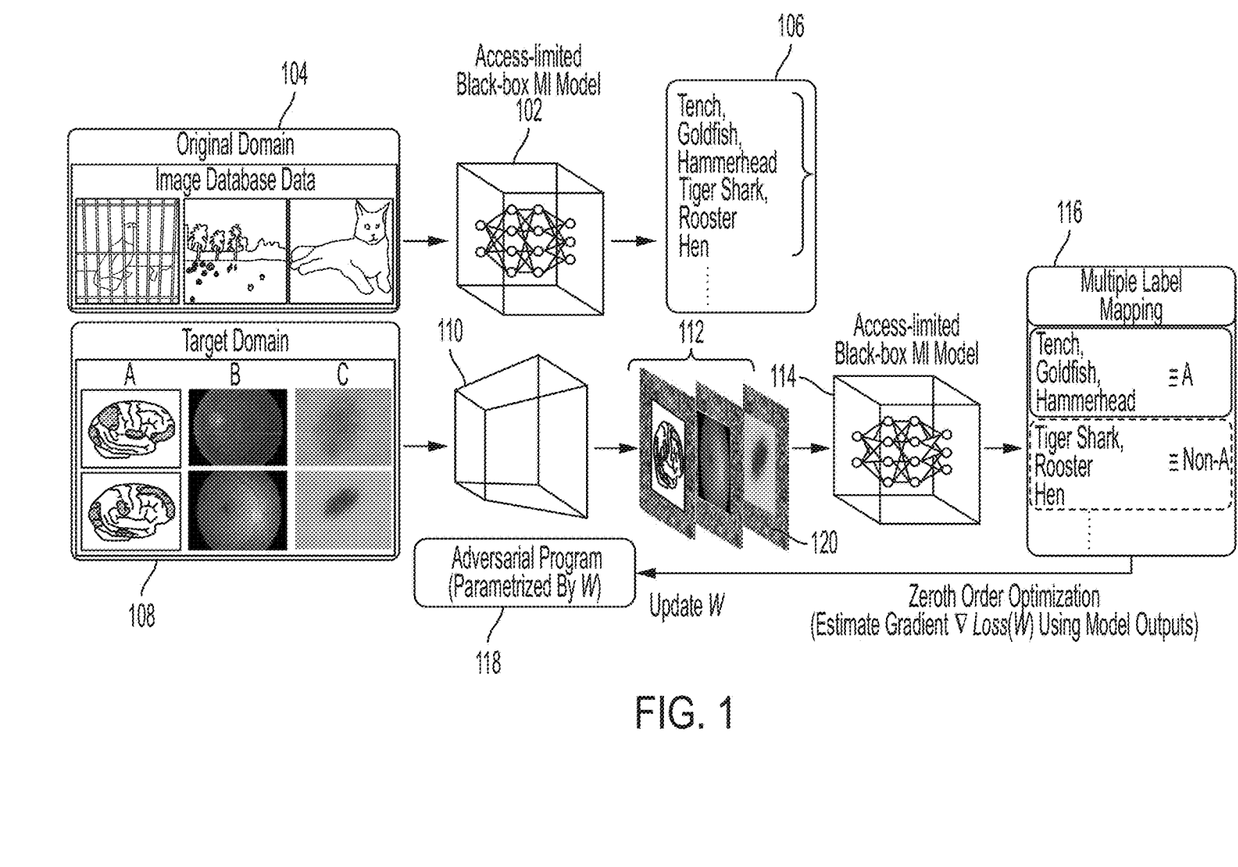

FIG. 1 is a diagram illustrating an overview of black-box adversarial reprogramming in an embodiment. The components shown include computer-implemented components, for instance, implemented and/or run on one or more processors such as hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors. A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

In one or more embodiments, to adapt to the black-box setting, the system and/or method leverage zeroth-order optimization on iterative input-output model responses to enable black-box transfer learning. The system and/or method in one or more embodiments also use multi-label mapping of source-domain and target-domain labels to enhance the performance of black-box adversarial reprogramming.

In an aspect, the system and/or method reprogram black-box ML models for transfer learning. For example, the system and/or method expand transfer learning to the black-box setting without knowing or fine-tuning the pre-trained model. Evaluation of the system and/or method used for transfer learning from pre-trained ImageNet models, as non-limiting examples, show the system and/or method consistently outperform the state-of-the-art methods and improve the accuracy of the fine-tuning approach by a significant margin.

Adversarial ML studies how to manipulate the decision-making of a target model and develop countermeasures. Adversarial reprogramming (AR) is a technique that aims to reprogram a target ML model for performing a different task. Different from typical transfer learning methods that modify the model architecture or parameters for solving a new task with target-domain data, AR keeps the model architecture unchanged. Instead, AR uses a trainable adversarial program and a designated output label mapping on the target-domain data samples to perform reprogramming. In an aspect, the adversarial program may serve as a parametrized and trainable input transformation function such that when applied to the target-domain data (e.g., images having squares), the same target model will be reprogrammed for the new task (e.g., the output label "dog" of a programmed data input translates to "3 squares").

An existing AR method requires complete access to the target ML model to allow back-propagation for training the parameters of adversarial program. For instance, such AR method lacks the ability to reprogram an access-limited ML model such as prediction API, owing to prohibited access to the target model disallowing back-propagation.

In one or more embodiments, the system and/or method use zeroth order optimization techniques to enable black-box AR for transfer learning, for example, for reprogramming advanced yet access-limited ML models trained with large amount of data and considerable computation resources. In contrast to the conventional first order (gradient-based) optimization methods such as stochastic gradient descent (SGD), zeroth order optimization can achieve gradient-free optimization by using numerical evaluations of the same training loss function instead of gradients, making it a powerful tool for the black-box setting. In an aspect, the gradients of black-box ML models can be infeasible to obtain. In such a case, in one or more embodiments, the system and/or method can use or implement the zeroth order optimization to replace the true gradients in first-order algorithms with gradient estimates from function evaluations.

Black-Box Setting

A machine learning model such as an image classification model 102 can be trained using data (e.g., referred to as original domain data or source domain data) 104 to output classification labels 106 or other output prediction. Given such a trained model (also referred to as a pre-trained model), the system and/or method in one or more embodiments can perform transfer learning for reprogramming the pre-trained model to output a prediction or classification based on target domain input data 108. By way of example, the pre-trained model can be an image classification model trained based on original domain data such ImageNet data or another database data to output image classification labels.

For example, the system and/or method may implement reprogramming a black-box ML classification model 114 (e.g., a pre-trained model such as shown at 102) denoted by $F: X \mapsto \mathbb{R}^K$, where the model takes a data sample $X \in X$ as an input and gives a vector of confidence scores $F(X)=[F_1(X), F_2(X), \ldots, F_K(X)] \in \mathbb{R}^K$ as its output, where X denotes the space of feasible data samples (e.g., image sizes and pixel value ranges) and K is the number of classes. In an aspect, similar to the access rights of a regular user when using a prediction API, one is able to observe the model output $F(X)$ for any given $X \in X$, whereas inquiring the gradient $\nabla F(X)$ may be inadmissible.

Adversarial Program

To reprogram a black-box ML model 114, the system and/or method in one or more embodiments use a form of adversarial program 110 as an input transformation function to translate the data of the target domain 108 to the input space of the source domain. Without loss of generality, let $X=[-1,1]^d$ denote the scaled input space of an ML model F, where d is the (vectorized) input dimension. In an aspect, the system and/or method may also denote the set of data from the target domain by $\{D_i\}_{i=1}^n$, where $D_i \in [-1,1]^{d'}$ and $d'<d$ to allow extra dimensions for reprogramming. For each data sample $i \in [n]$, where $[n]$ denotes the integer set $\{1, 2, \ldots, n\}$, the system and/or method in one or more embodiments let $X_i$ be the zero-padded data sample containing $D_i$, such as embedding a brain-regional correlation graph of size 200× 200 to the center of a 299×299 (width×height) image, as shown at 112. Let $M \in \{0,1\}^d$ be a binary mask function indicating the common embedding location for $\{D_i\}_{i=1}^n$, where $M_j=0$ means the j-th dimension is used for embedding and $M_j=1$ otherwise. The transformed data sample for AR is defined as $$\tilde{X}_i = X_i + P \text{ and } P = \tanh(W \odot M), \quad (1)$$

where P is called an adversarial program to be learned and is universal to all target data samples $\{X_i\}_{i=1}^n$, $W \in \mathbb{R}^d$ is a set of trainable parameters for AR, $\odot$ denotes the Hadamard (entry-wise) product, and $\tanh \in [-1,1]$ ensures $\tilde{X}_i \in [-1,1]^d$. In an aspect, the binary mask function M in P ensures the target data samples $\{D_i\}$ embedded in $\{X_i\}$ are intact during AR. For example, the transformed input data sample shown at 112 includes the target data samples shown at 108 and frames around the target data samples, the frames 120 representing learnable or trainable parameters in AR.

Multi-Label Mapping (MLM)

As illustrated in FIG. 1, in addition to input data transformation via an adversarial program, the system and/or method in one or more embodiments also map the source task's output labels (e.g., different objects) 106 to the target task's output labels, for example, shown at 116 as 'A' and 'non-A'. For example, in medical imaging, target labels can include different medical conditions such as Autism Spectrum Disorder (ASD) (e.g., shown as 'A' in FIG. 1) or non-ASD, diabetic retinopathy (DR) (e.g., shown as 'B' in FIG. 1), and melanoma (e.g., shown as 'C' in FIG. 1), and/or others. The system and/or method in one or more embodiments may map a source label to a target label. The system and/or method in one or more embodiments may map multiple-source-labels to one-target-label. Such mapping can further improve the accuracy of the target task, for example, when compared to one-to-one label mapping. For instance, the prediction of a transformed data input from the source label set {Tench, Goldfish, Hammerhead} can be reprogrammed for predicting the target class, e.g., ASD. Let K (K') be the total number of classes for the source (target) task. The system and/or method in one or more embodiments use the notation $h_j(\cdot)$ to denote the k-to-1 mapping function that averages the predictions of a group of k source labels as the prediction of the j-th target domain's label. For example, if the source labels {Tench, Goldfish, Hammerhead} map to the target label {ASD}, then $h_{ASD}(F(X))= [F_{Tench}(X)+F_{Goldfish}(X)+F_{Hammerhead}(X)]/3$. More generally, if a subset of source labels $\mathcal{S} \subset [K]$ map to a target label $j \in [K']$, then $$h_j(F(X)) = \frac{1}{|\mathcal{S}|} \Sigma_{s \in \mathcal{S}} F_s(X),$$

where $|\mathcal{S}|$ is the set quantity or the number of elements in S. In an embodiment, the system and/or method may use or implement random label mapping of source labels to a target label. In another embodiment, the system and/or method may use or implement a frequency-based label mapping scheme by matching target labels to source labels according to the label distribution of initial predictions on the target-domain data before reprogramming. For example, frequency-based multi-label mapping (MLM) derived from the initial predictions of the target-domain data before reprogramming can be used.

Loss Function for AR

In an embodiment, the training loss for AR can be formally defined as follows. Without loss of generality, the system and/or method in one or more embodiments assume the model output is properly normalized such that $\Sigma_{j=1}^K F_j(X)=1$ and $F_j(X) \geq 0$ for all $j \in [K]$, which can be satisfied by applying a softmax function to the model output. Let $\{y_i\}_{i=1}^n$ with $y_i=[y_{i1}, \ldots, y_{iK'}] \in \{0,1\}^{K'}$ denote the one-hot encoded label for the target domain task and let $h(F(X))= [h_1(F(X)), \ldots, h_{K'}(F(X))]$ be a surjective multi-label mapping function from the model prediction $F(X)$ of the source domain to the target domain. For training the adversarial program P parametrized by W 118, the system and/or method in one or more embodiments use a focal loss. For instance, the focal loss can empirically improve the performance of AR/BAR. Other loss function can be used or implemented. In an aspect, the focal loss (F-loss) aims to penalize the samples having low prediction probability during training, and it includes the conventional cross entropy loss (CE-loss) as a special case. The focal loss of the ground-truth label $\{y_i\}_{i=1}^n$ and the transformed prediction probability $\{h(F(X_i+P))\}_{i=1}^n$ is $$-\sum_{i=1}^n \sum_{j=1}^{K'} \omega_j (1-h_j)^\gamma y_{ij} \log h_j(F(X_i+P)), \quad (2)$$

where $\omega_j > 0$ is a class balancing coefficient, $\gamma \geq 0$ is a focusing parameter which down-weights high-confidence (large $h_j$) samples. When $\omega_j = 1$ for all $j$ and $\gamma = 0$, the focal loss reduces to the cross entropy. In an embodiment of an implementation, the system and/or method may set $\omega_j = 1/n_j$ and $\gamma = 2$, where $n_j$ is the number of samples in class $j$.

In an aspect, the loss function is a function of W since from Eq. (1) the adversarial program P is parametrized by W, and W is the set of optimization variables to be learned for AR. In one or more embodiments, the loss function can be further generalized to the minibatch setting for stochastic optimization.

A loss function, for example, differentiates foreground-background variances, for example, in AR setting, in which foreground can be considered as being the embedded target-domain data and background can be considered as being the learned universal adversarial program.

Zeroth Order Optimization for BAR

In the white-box setting assuming complete access to the target ML model F, optimizing the loss function in Eq. (2) and retrieving its gradient for AR can be done via back-propagation. However, when F is a black-box model and only the model outputs $F(\bullet)$ are available for AR, back-propagation through F is infeasible since the gradient $\nabla F(\bullet)$ is inadmissible. In a BAR framework, for example, the system and/or method in one or more embodiments may optimize the loss function in Eq. (2) and update the parameters W of the adversarial program, for example, using zeroth order optimization to solve for W. For example, there can be components in BAR which can include (i) gradient estimation and (ii) gradient descent with estimated gradient.

Query-Efficient Gradient Estimation

Let $f(W)$ be the Loss defined in Eq. (2) and W be the optimization variables. To estimate the gradient $\nabla f(W)$, the system and/or method in one or more embodiments use the one-sided averaged gradient estimator via q random vector perturbations, which is defined as $$\bar{g}(W) = \frac{1}{q} \sum_{j=1}^q g_j, \quad (3)$$

where $\{g_j\}_{j=1}^q$ are q independent random gradient estimates of the form $$g_j = b \cdot \frac{f(W + \beta U_j) - f(W)}{\beta} \cdot U_j, \quad (4)$$

where b is a scalar balancing bias and variance trade-off of the estimator, $W \in \mathbb{R}^d$ is the set of optimization variables in vector form, $\beta$ is the smoothing parameter, and $U_j \in \mathbb{R}^d$ is a vector that is uniformly drawn at random from a unit Euclidean sphere. The mean squared estimation error between $\bar{g}(W)$ and the true gradient $\nabla f(W)$ has been characterized with mild assumptions on $f$. In an experimental setup, the system and/or method in one or more embodiments set b=d in order to obtain an unbiased gradient estimator of a smoothed function of $\nabla f$, and the system and/or method in one or more embodiments set $\beta$ to be of the order 1/d (i.e., $\beta$=0.01) and set $U_j$ to be a realization of a standard normal Gaussian random vector divided by its Euclidean norm. By construction, for each data sample $X_i$, $i \in [n]$, the averaged gradient estimator takes q+1 queries from the ML model F. Smaller q can reduce the number of queries to the target model but may incur larger gradient estimator error. In an aspect, zeroth order optimization, for example, can be query-based and gradient-free, and gradually changes parameters.

BAR Algorithm

Using the averaged gradient estimator $\bar{g}$, the BAR algorithm can be compatible with any gradient-based training algorithm by replacing the inadmissible gradient $\nabla \text{Loss}$ with $\bar{g}$ in the gradient descent step. The corresponding algorithmic convergence guarantees have been proved in both the convex loss and non-convex loss settings. The system and/or method in one or more embodiments may use stochastic gradient descent (SGD) with $\bar{g}$ to optimize the parameters W in BAR, which are updated by $$W_{t+1} = W_t - \alpha_t \bar{g}(W_t), \quad (5)$$

where t is the t-th iteration for updating W with a minibatch sampled from $\{X_i\}_{i=1}^n$ (by way of example, the system and/or method in one or more embodiments can set the minibatch size to be 20), $\alpha_t$ is the step size (by way of example, the system and/or method in one or more embodiments can use exponential decay with initial learning rate $\eta$), and $\bar{g}(W_t)$ is the gradient estimate of the loss function at $W_t$ using the t-th minibatch. Note that since the loss function defined in Eq. (2) is a function of the target ML model F's input and output, and the parameters W of the adversarial program only associate with the input of F, the entire gradient estimation and training process for BAR is indeed operated in a black-box manner. That is, BAR may only use input-output responses of F and does not assume access to the model internal details such as model type, parameters, or source-domain data. In an aspect, the entire training process for BAR takes #iterations×minibatchsize×(q+1) queries to F.

The system and/or method, for example, use an input transformation function parametrized by W for the target data, assign an output label mapping (e.g., many-to-one) between source and target labels, and optimize W with gradient-free optimization with the target data.

Algorithm 1 below summarizes a BAR method in an embodiment. For the ease of description, the minibatch size is set to be the training data size n in Algorithm 1. Another minibatch size can be utilized. Algorithm 1 determines or outputs optimized parameters W.

---

Algorithm 1: Training algorithm of black-box adversarial reprogramming (BAR)

Input: black-box ML model F, AR loss function Loss(·), target domain training data $\{D_i, y_i\}_{i=1}^n$, maximum number of iterations T, number of random vectors for gradient estimation q, multi-labed mapping function h(·), step size $\{\alpha_t\}_{t=1}^T$ -continued ---
Algorithm 1: Training algorithm of black-box adversarial reprogramming (BAR)
---
Output: Optimal adversarial program parameters W
1:     Randomly initialize W; set t = 1
2:     Embed $\{D_i, y_i\}_{i=1}^n$ with mask M to create $\{X_i\}_{i=1}^n$
3:     while t ≤ T do
4:         # Generate adversarial program
            P = tanh(W ⊙ M)
            # Generate q perturbed adversarial programs
            $\tilde{P}_j = \tanh((W + U_j) \odot M)$ for all j ∈ [q]
            $\{U_j\}_{j=1}^q$ are random vectors defined in Eq. (4)
5:         # Function evaluation for gradient estimation
            Evaluate Loss in Eq. (2) with W and $\{X_i + P\}_{i=1}^n$
            Evaluate Loss in Eq. (2) with $W + U_j$ and $\{X_i + \tilde{P}_j\}_{i=1}^n$ for all j ∈ [q]
6:         # Optimize adversarial program's parameters:
            Use Step 5 and Eq. (3) to obtain estimated gradient $\bar{g}(W)$
            $W \leftarrow W - \alpha_t \cdot \bar{g}(W)$
            t ← t + 1
7:     end while

---

Figure 2:
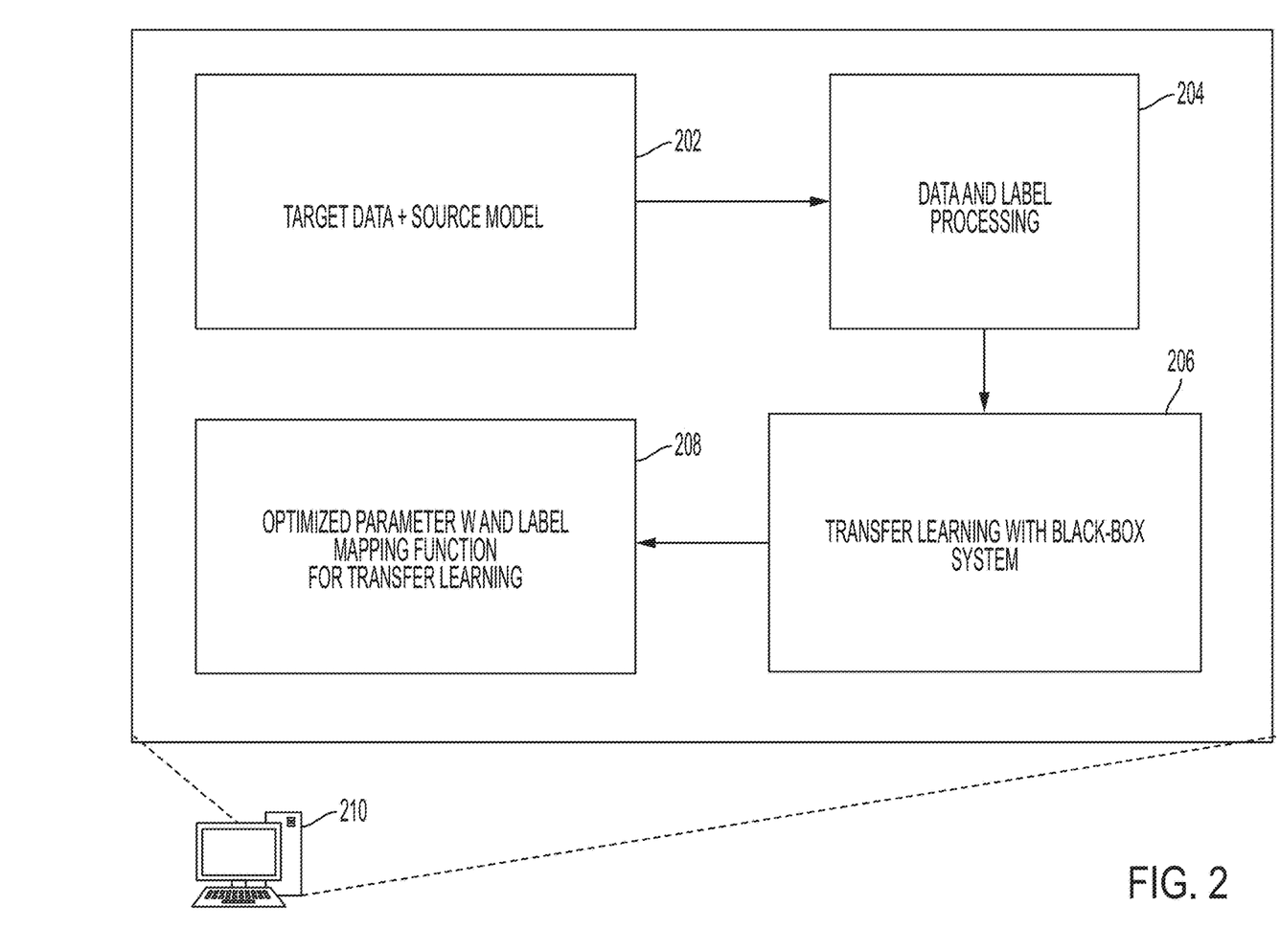

FIG. 2 is a block diagram illustrating a procedure for black-box adversarial reprogramming in an embodiment. The components shown in FIG. 2 can be implemented and/or run on one or more processors such as hardware processors, or coupled with one or more hardware processors. At 202, input data can be received or obtained. Input target data can include any data types, for example, which can be provided by a user. In an aspect, the target data can include labels. Input source model can be a black-box model, for example, any source model or black-box source model. Other "Input" described above in Algorithm 1, can be received, obtained, or configured.

At 204, a processor uses input transformation function on the target data parametrized by W for transforming or translating target data (e.g., according to Eq. (1)). For instance, the input transformation function can be received or configured. For instance, "the number of random vectors for gradient estimation q" and "step size $\{\alpha_t\}_{t=1}^T$", described above as part of "Input" in Algorithm 1 can be used to translate target data (e.g., as shown at 116 in FIG. 1). For example, in Algorithm 1, the following code,

```
2:    Embed {D_i}_{i=1}^n with mask M to create {X_i}_{i=1}^n ;
3:    while t ≤ T do
4:        # Generate adversarial program
          P = tanh(W ⊙ M)
``` uses input transformation function on the target data parametrized by W.

The processor also maps source labels to target labels. In an embodiment, the processor may map multiple source labels to a target label (e.g., multiple-to-one mapping). For instance, label mapping function can be received or configured. For example, "multi-label mapping function h(•)", described above as part of "Input" in Algorithm 1 can be used to map source labels to target labels (e.g., shown at 116 in FIG. 1). For example, a processor assigns output-label mapping function h(•) between source and target data predictions.

At 206, a processor selects a training loss function and trains the parameters W with gradient-free optimization. For instance, the processor selects a training loss function f for W and the target task, e.g., cross entropy (e.g., focal loss). The processor uses a gradient-free technique to optimize f (e.g., shown in Eq. (4)). The processor obtains optimized W and uses W and the label mapping function h for transfer learning with the black-box model. For example, in Algorithm 1, the following code may be run to perform a task at 206.

```
# Generate q perturbed adversarial programs
P̃_j = tanh((W + U_j) ⊙ M) for all j ∈ [q]
{U_j}_{j=1}^q are random vectors defined in Eq. (4)
5:   # Function evaluation for gradient estimation
     Evaluate Loss in Eq. (2) with W and {X_i + P}_{i=1}^n
     Evaluate Loss in Eq. (2) with W + U_j and {X_i + P̃_j}_{i=1}^n for all j ∈ [q]
6:   # Optimize adversarial program's parameters:
     Use Step 5 and Eq. (3) to obtain estimated gradient ḡ(W)
     W ← W - α_t · ḡ(W)
     t ← t + 1
```

At 208, optimized parameter W and label mapping function for transfer learning can be presented.

In one or more embodiments, different number of random vectors q and multi-label mapping (MLM) size m for BAR, which can be configurable, can be used or implemented (m and q can be numbers, e.g., integer values). Different loss functions (e.g., CE-loss, F-loss) and label mapping methods (e.g., random mapping, frequency mapping) can be implemented or used for BAR.

For example, for random mapping, for each target-domain class, the system and/or method in one or more embodiments can randomly assign m separate labels from the source domain. For frequency mapping, in each task, the system and/or method in one or more embodiments may obtain the source-label prediction distribution of the target-domain data before reprogramming. Based on the distribution, the system and/or method in one or more embodiments may then sequentially assign the most frequent source-label to the corresponding dominating target-label until each target-label has been assigned with m source-labels.

The system and/or method in one or more embodiments provide adversarial reprogramming of black-box ML models, for example, using zeroth order optimization and multi-label mapping techniques. In one or more embodiments black-box adversarial reprogramming need not assume or require complete knowledge of the target ML model, for example, may only require input-output model responses, enabling black-box transfer learning of access-limited ML models. In an aspect, the results provide a new perspective and an effective approach for transfer learning without knowing or modifying the pre-trained model.

Figure 3:
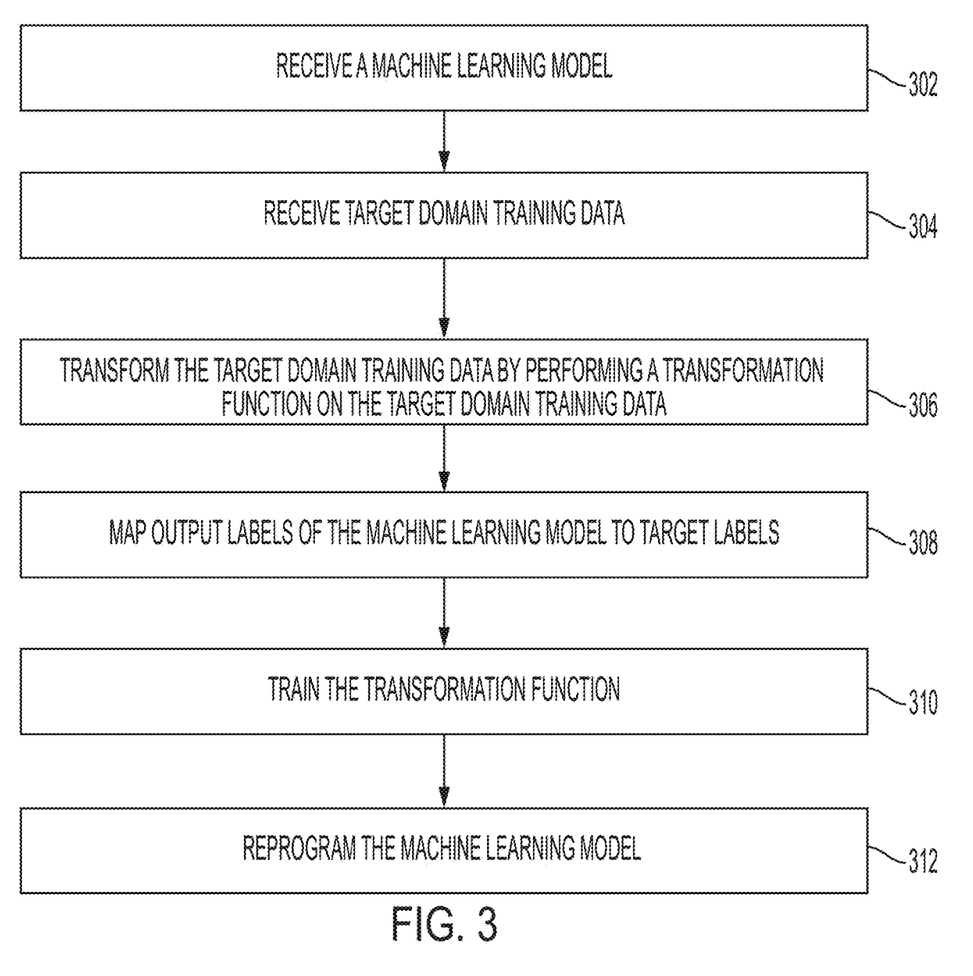

FIG. 3 is a flow diagram illustrating a method of adversarial reprogramming in an embodiment, of a model such as an artificial intelligence model such as a neural network, for example, without requiring full access to the model. The method can be run on or performed by one or more processors such as one or more hardware processors. At 302, a machine learning model is received. For example, the machine learning model can be access-limited model such as a black-box model, where users do not have full or complete access to its architecture or parameters such as weights. For example, the machine learning model can include an access-limited black-box machine learning model, which is pre-trained based on source data different from the target domain training data and which is pre-trained to predict source labels different from the target labels.

At 304, target domain training data for reprogramming the machine learning model using transfer learning can be received. By way of example, the target domain training data can include medical imaging data and the target labels can include medical conditions detected in the medical imaging data, wherein the machine learning model is pre-trained based on non-medical image data and pre-trained to classify output labels unrelated to medical conditions.

At 306, the target domain training data is transformed or translated by performing a transformation function on the target domain training data.

At 308, output labels of the machine learning model can be mapped to target labels associated with the target domain training data. In an embodiment, mapping may include multiple-to-one mapping, wherein multiple of the output labels of the machine learning model are mapped to a target label of the target labels. In an embodiment, mapping may include mapping m output labels of the machine learning model to a target label of the target labels, and m can be configurable. In an embodiment, mapping may include randomly mapping the output labels to the target labels. In an embodiment, mapping may include frequency-based mapping, wherein output label prediction distribution of the target domain training data is obtained from the machine learning model before reprogramming, and a most frequent output label prediction is assigned to a corresponding dominating target label until each target label is assigned with a source label. For instance, the most frequent output label(s) predicted may be assigned to the most dominating target label, the next most frequent output label(s) predicted may be assigned to the next most dominating target label, and so on, until all target labels are assigned with one or more label labels. A source label refers to a label, which the machine learning model is pre-trained to predict. A target label refers to a label associated with the target domain training data.

At 310, the transformation function can be trained by optimizing a parameter of the transformation function. In an embodiment, training the transformation function can include performing zeroth order optimization. In an embodiment, the transformation function can be optimized using q random vector perturbations, and q can be configurable.

At 312, the machine learning model can be reprogrammed using the target domain training data transformed by the trained transformation function and the mapped target labels. For example, the machine learning model can be run with input data transformed or translated with the trained transformation function and the output from the run can be mapped to the target labels, for example, based on output-to-target label mapping.

By way of example, reprogramming different pre-trained black-box models using BAR shows that BAR can effectively perform transfer learning of black-box models. For example, image classification models reprogrammed for medical imaging classification tasks such as autism spectrum disorder classification, diabetic retinopathy detection, and melanoma detection, show accuracy of BAR. Also by way of example, online Machine Learning-as-a-Service (MLaaS) toolsets reprogrammed for imaging tasks show that BAR produces accurate and efficient results. Other prediction and/or classification models can be reprogrammed.

For instance, detecting or classifying images can present a challenge. By way of example, classifying medical images such as Autism Spectrum Disorder (ASD) is a challenging task. ASD is a complex developmental disorder that involves persistent challenges in social interaction, speech and nonverbal communication, and restricted/repetitive behaviors. Currently, the clinical methods for diagnosing ASD are standardized ASD tests, which require prolonged diagnostic time and considerable medical costs. Therefore, ML can play an important role in providing cost-effective means of detecting ASD. For instance, transfer learning disclosed herein can be used in ML for detecting ASD. By way of an example experiment, a processor can use a dataset from an existing database. The data sample can include a 200×200 brain-regional correlation graph of fMRI measurements, embedded in each shading (e.g., pixel values) channel of ImageNet-sized inputs. For example, the processor can assign 5 separate ImageNet labels to each ASD label (i.e., ASD/non-ASD) for MLM and set the parameters $\eta=0.05$ and $q=25$. Table 1 reports the 10-fold cross validation test accuracy, where the averaged test data size is 104. Experiments show that the accuracy of BAR is comparable to white-box AR.

By way of another example experiment, the transfer learning disclosed herein can be used in Diabetic Retinopathy (DR) detection. The task of Diabetic Retinopathy (DR) detection is to classify high-resolution retina imaging data. For example, the goal can be to predict different scales ranging from 0 to 4 corresponding to the rating of presence of DR. Collecting labeled data for diagnosing DR is a costly and time-consuming process, as it requires experienced and well-trained clinicians to make annotations on the digital retina images. The collected dataset contains 5400 data samples and a method disclosed herein may hold 2400 data samples as the test set. In this task, a processor may set the parameters $\eta=0.05$, $q=55$ and use 10 labels per target class for MLM. Experimental results from reprogramming different pre-trained classifiers using the method in one or more embodiments disclosed herein show the method can achieve accuracy in its prediction/classification.

By way of yet another example experiment, the transfer learning disclose herein can be used in melanoma detection. Skin cancer is a common type disease. However, visual inspection of the skin and differentiating the type of skin diseases still remains as a challenging problem. ML-based approaches can be used to address this challenge. In this example experiment, the target-domain dataset can be extracted from an existing database, containing images of different types of skin cancer. For example, the average image size can be 450×600 pixels. A processor implementing a method disclosed herein may resize these data samples to be 64×64 pixels and embed them in the center of ImageNet-sized inputs. For data set, which may include data distribution that is imbalanced (e.g., 70% data samples belong to one class), the processor may perform re-sampling on the training data to ensure the same sample size for each class. As an example, the training/testing data samples can be 7800/780. In this task, the processor may assign 10 separate ImageNet labels to each target-domain label for MLM and set the parameters η=0.05 and q=65. Experiment results in this task show findings that BAT attains accuracy in its prediction.

By yet another example experiment, the method in one or more embodiments can be used in reprogramming online ML-as-a-Service (MLaaS) toolkits, which, for example, are access-limited (black-box) ML models to end users. Such an experiment further demonstrates the practicality of BAR in reprogramming access-limited (black-box) ML models. In one example of such a model, a regular user on an MLaaS platform can provide any data input (of the specified format) and observe a model's prediction via a prediction API, but has no information about the model and training data used. Another example of such a model allows users to upload labeled datasets and trains an ML model for prediction, but the trained model is unknown to users. In such model settings, acquiring input gradients or modifying the target model is inadmissible via prediction APIs. The method disclosed herein, in one or more embodiments, can use the inference power of these unknown ML models and reprogram them for prediction, classification or detection tasks, e.g., autism spectrum disorder classification or diabetic retinopathy detection tasks or other prediction tasks.

For example, a source model trained on a dataset of appropriate and inappropriate content to predict or classify a given data as appropriate or inappropriate can be reprogrammed via the method disclosed herein in one or more embodiments to perform a different task, for example, classify a target label different from source labels, for example, classify a medical condition in a given dataset, such as ASD, DR, or melanoma.

As another example, a black-box model which performs a traffic sign image recognition (e.g., with 43 classes), which a user can run via prediction API, can be reprogrammed with transfer learning disclosed herein in one or more embodiments. For instance, different number of random vectors q (e.g., 1, 5, 10) and a fixed number of random label mapping m=6 can be used to reprogram it for predicting/classifying ASD task or another task.

In one or more embodiments, different q and m values can be set or used, and different mappings such as frequency-based and/or random mappings can be used. In one or more embodiments, such values and mappings can be set to balance improvements in accuracy and cost of increased query and expense. For example, setting a larger q value for a more accurate gradient estimation may improve the accuracy but incur the price of increased query and expense costs.

While the above description referred to transferring learning in a black-box model, the system and/or method in one or more embodiments can also apply to a white-box model, or a model allowing access to its architecture and weights. For instance, regardless of whether a model allows or not allows access to its architecture and/or weights, the system and/or method can be applicable.

In an embodiment, a method of using a computing device to reprogram a black box machine learning model with limited access to data using transfer learning can be provided. The method may include receiving by a computing device a black box machine learning model for reprogramming using transfer learning. The method may also include receiving by the computing device target domain training data for reprogramming the black box model. The method may further include performing by the computing device an input transformation function on the target domain training data. The method may also include assigning by the computing device labels to the target domain training data transformed by the input transformation function. The method may further include reprogramming by the computing device the black box machine learning model using the target domain training data transformed by the input transformation function and the assigned labels.

The system and/or method in one or more embodiments may expand transfer learning to new settings, for example, providing for accuracy with black-box high-performance models, low cost for accurate models such as but not limited to disease classification models, practicality in working with target data with limited data samples and labels, and impact which shows a new way to reprogram and/or repurpose fixed ML models. The system and/or method in one or more embodiments may provide for a low cost and high accuracy approach, and may allow for what was not possible in transfer learning possible.

Figure 4:
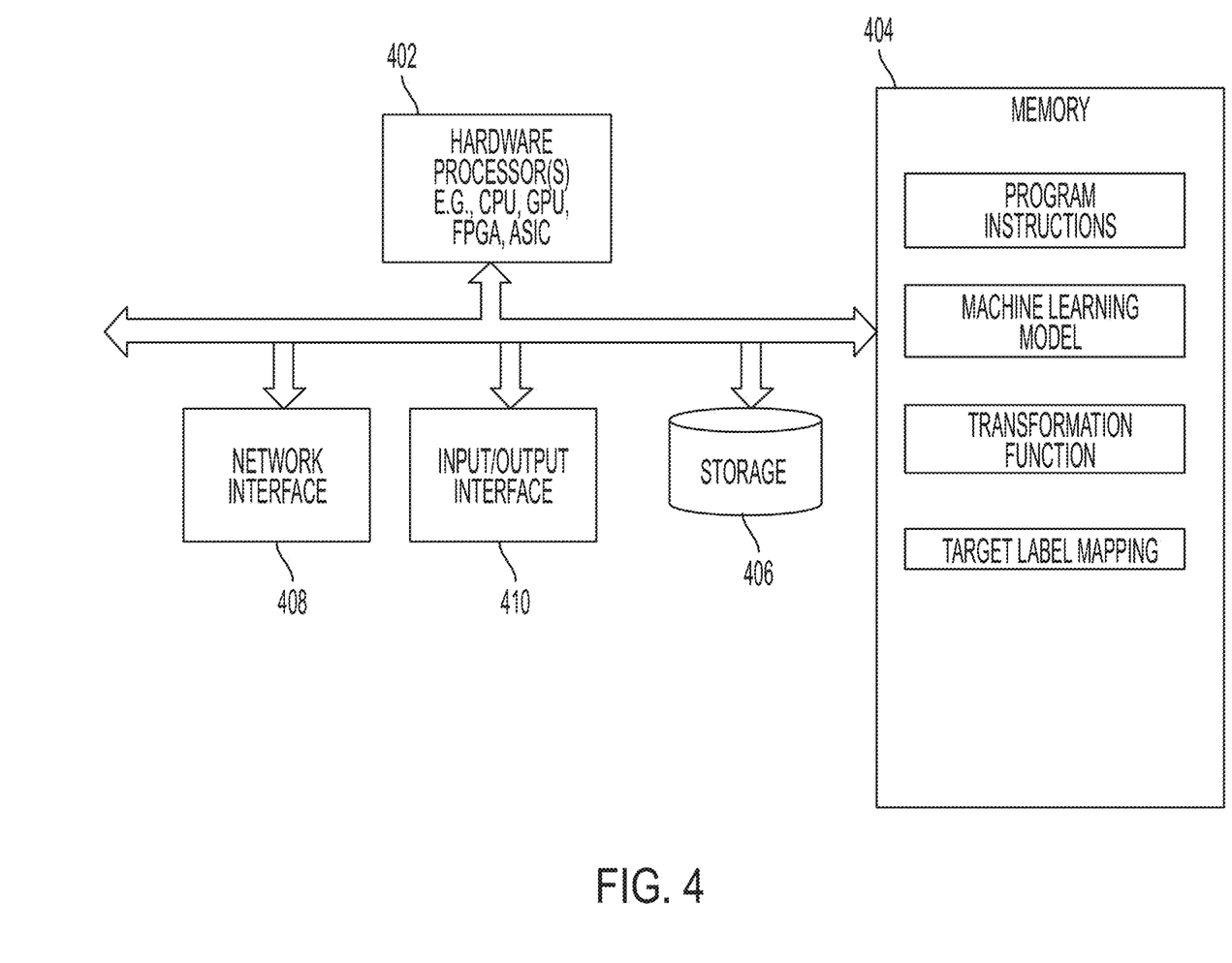

FIG. 4 is a diagram showing components of a system in one embodiment, which can provide transfer learning, for example, in black-box machine learning models. One or more hardware processors 402 such as a central processing unit (CPU), a graphic process unit (GPU), and/or a Field Programmable Gate Array (FPGA), an application specific integrated circuit (ASIC), and/or another processor, may be coupled with a memory device 404, and provide transfer learning capabilities, e.g., as disclosed herein. A memory device 404 may include random access memory (RAM), read-only memory (ROM) or another memory device, and may store data and/or processor instructions for implementing various functionalities associated with the methods and/or systems described herein. One or more processors 402 may execute computer instructions stored in memory 404 or received from another computer device or medium. A memory device 404 may, for example, store instructions and/or data for functioning of one or more hardware processors 402, and may include an operating system and other program of instructions and/or data. One or more hardware processors 402 may receive input, which can include a source machine learning model and target domain training data. For instance, at least one hardware processor 402 may train a transformation function and provide source output label to target label mappings. In one aspect, such input data may be stored in a storage device 406 or received via a network interface 408 from a remote device, and may be temporarily loaded into a memory device 404 for implementing transfer learning. The learned or trained transformation function and source output label to target label mappings may be stored on a memory device 404, for example, for use by one or more hardware processors 402. One or more hardware processors 402 may be coupled with interface devices such as a network interface 408 for communicating with remote systems, for example, via a network, and an input/output interface 410 for communicating with input and/or output devices such as a keyboard, mouse, display, and/or others.

Figure 5:
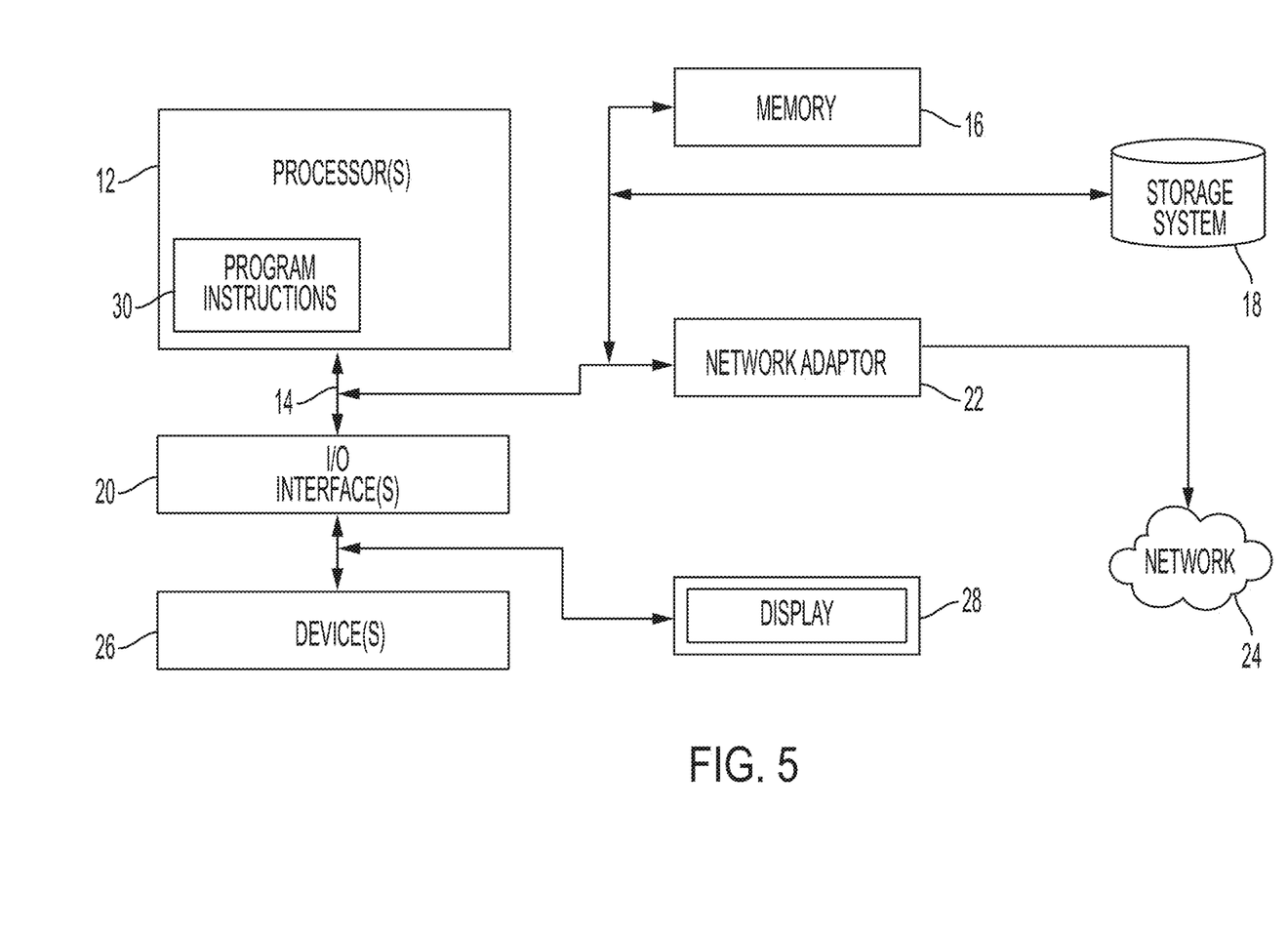

FIG. 5 illustrates a schematic of an example computer or processing system that may implement a transfer learning system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction run device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
receiving a machine learning model;
receiving target domain training data for reprogramming the machine learning model using transfer learning;
transforming the target domain training data by performing a transformation function on the target domain training data, wherein the transforming pads the target domain training data, wherein the transformation function includes at least a trainable parameter and a binary mask function, wherein the transformation function is used in implementing adversarial reprogramming in machine learning, wherein parameters of the machine learning model are unobservable;
mapping output labels of the machine learning model to target labels associated with the target domain training data, wherein the mapping includes frequency-based mapping, wherein output label prediction distribution of the target domain training data is obtained from the machine learning model before reprogramming, and a most frequent output label prediction is assigned to a corresponding dominating target label until each target label is assigned with a source label;

training the transformation function by optimizing parameter of the transformation function; and reprogramming the machine learning model using the target domain training data transformed by the trained transformation function and the mapping of output labels to target labels.

2. The method of claim 1, wherein the machine learning model is a black-box machine learning model.

3. The method of claim 1, wherein the mapping includes multiple-to-one mapping, wherein multiple of the output labels of the machine learning model are mapped to a target label of the target labels.

4. The method of claim 1, wherein the mapping includes mapping m output labels of the machine learning model to a target label of the target labels, wherein m is configurable.

5. The method of claim 1, wherein the mapping includes randomly mapping the output labels to the target labels.

6. The method of claim 1, wherein the machine learning model includes an access-limited black-box machine learning model, which is pre-trained based on source data different from the target domain training data and which is pre-trained to predict source labels different from the target labels.

7. The method of claim 1, wherein the training the transformation function by optimizing a parameter of the transformation function includes performing zeroth order optimization.

8. The method of claim 1, wherein the transformation function is optimized using q random vector perturbations, wherein q is configurable.

9. The method of claim 1, wherein the target domain training data includes medical imaging data and the target labels include medical conditions detected in the medical imaging data, wherein the machine learning model is pre-trained based on non-medical image data and pre-trained to classify output labels unrelated to medical conditions.

10. A system comprising:
a processor; and
a memory device coupled with the processor;
the processor configured at least to:
receive a machine learning model;
receive target domain training data for reprogramming the machine learning model using transfer learning;
transform the target domain training data by performing a transformation function on the target domain training data, wherein the target domain training data is padded, wherein the transformation function includes at least a trainable parameter and a binary mask function, wherein the transformation function is used in implementing adversarial reprogramming in machine learning, wherein parameters of the machine learning model are unobservable;
map output labels of the machine learning model to target labels associated with the target domain training data, wherein the processor is configured to map the output labels by frequency-based mapping, wherein output label prediction distribution of the target domain training data is obtained from the machine learning model before reprogramming, and a most frequent output label prediction is assigned to a corresponding dominating target label until each target label is assigned with a source label; and
train the transformation function by optimizing parameter of the transformation function.

11. The system of claim 10, wherein the machine learning model is reprogrammed using the mapping of output labels to target labels and the trained transformation function that translates input target data.

12. The system of claim 10, wherein the machine learning model is a black-box machine learning model.

13. The system of claim 10, wherein the processor is configured to map m output labels of the machine learning model to a target label of the target labels, wherein m is a configurable integer.

14. The system of claim 10, wherein the processor is configured to randomly map the output labels to the target labels.

15. The system of claim 10, wherein the machine learning model includes an access-limited black-box machine learning model, which is pre-trained based on source data different from the target domain training data and which is pre-trained to predict source labels different from the target labels.

16. The system of claim 10, wherein the processor is configured to train the transformation function by performing zeroth order optimization.

17. The system of claim 10, wherein the transformation function is optimized using q random vector perturbations, wherein q is configurable.

18. A computer program product comprising a computer readable storage medium having program instructions embodied therewith, the program instructions readable by a device to cause the device to:
receive a machine learning model;
receive target domain training data for reprogramming the machine learning model using transfer learning;
transform the target domain training data by performing a transformation function on the target domain training data, wherein the target domain training data is padded, wherein the transformation function includes at least a trainable parameter and a binary mask function, wherein the transformation function is used in implementing adversarial reprogramming in machine learning, wherein parameters of the machine learning model are unobservable;
map output labels of the machine learning model to target labels associated with the target domain training data, wherein the device is caused to map the output labels by frequency-based mapping, wherein output label prediction distribution of the target domain training data is obtained from the machine learning model before reprogramming, and a most frequent output label prediction is assigned to a corresponding dominating target label until each target label is assigned with a source label; and
train the transformation function by optimizing parameter of the transformation function.

* * * * *